(12) United States Patent
Von Broembsen

(10) Patent No.: US 8,163,141 B2
(45) Date of Patent: Apr. 24, 2012

(54) CHLORINATION SYSTEM FOR SWIMMING POOLS AND THE LIKE

(75) Inventor: David Von Broembsen, Atlanta, GA (US)

(73) Assignee: Chlorking, Inc., Norcross, GA (US)

( * ) Notice: Subject to any disclaimer, the term of this patent is extended or adjusted under 35 U.S.C. 154(b) by 1594 days.

(21) Appl. No.: 11/274,671

(22) Filed: Nov. 15, 2005

(65) Prior Publication Data

US 2006/0097878 A1    May 11, 2006

Related U.S. Application Data

(63) Continuation-in-part of application No. 10/986,526, filed on Oct. 18, 2004, now abandoned.

(51) Int. Cl.
*C02F 1/46* (2006.01)
(52) U.S. Cl. .................. 204/269; 204/275.1; 204/278.5
(58) Field of Classification Search .................. 205/620; 204/275.1, 269, 278.5
See application file for complete search history.

(56) References Cited

U.S. PATENT DOCUMENTS

| 820,113 | A | | 5/1906 | Hinkson |
|---|---|---|---|---|
| 3,792,979 | A | | 2/1974 | Clinton |
| 4,085,028 | A | * | 4/1978 | McCallum ................. 204/269 |
| 4,173,525 | A | | 11/1979 | Nakamatsu et al. |
| 4,392,937 | A | | 7/1983 | Schmitt et al. |
| 4,869,016 | A | | 9/1989 | Diprose et al. |
| 5,460,706 | A | | 10/1995 | Lisboa |
| 5,468,360 | A | | 11/1995 | David et al. |
| 6,391,167 | B1 | | 5/2002 | Grannersberger |
| 7,160,434 | B2 | * | 1/2007 | Becker et al. ................. 205/742 |
| 2003/0024809 | A1 | * | 2/2003 | Broembsen ................. 204/275.1 |

FOREIGN PATENT DOCUMENTS

GB    1426017    2/1976

\* cited by examiner

*Primary Examiner* — Arun S Phasge
(74) *Attorney, Agent, or Firm* — Woodcock Washburn LLP

(57) ABSTRACT

An improved chlorination system for pools, spas, potable water supplies, and the like, provides a vertically oriented electrolytic cell connected between a pump and a lightly salinated pool. The cell preferably contains a metallic electrode, such as titanium, and a precious metal coated titanium electrode, and has means for passing an electric current through the cell. The present invention further provides a novel electrode stack design, conducive for forming an efficient chlorinator comprising a plurality of interconnecting electrode stacks of separate electrical cells.

15 Claims, 7 Drawing Sheets

CHLORINATION SYSTEM FOR SWIMMING POOLS AND THE LIKE

CROSS-REFERENCE TO RELATED APPLICATIONS

To the fullest extent permitted by law, the present continuation-in-part application claims priority to and the full benefit of U.S. non-provisional patent application 2005/0061662 filed Oct. 18, 2004, U.S. non-provisional patent application Ser. No. 10/173,359 filed Jun. 17, 2002 now U.S. Pat. No. 6,821,398, U.S. provisional patent application Ser. No. 60/145,537 filed Jul. 26, 1999, U.S. provisional patent application Ser. No. 60/148,452 filed Aug. 12, 1999, and U.S. non-provisional patent application Ser. No. 09/592,719 filed Jun. 13, 2000, now abandoned.

BACKGROUND OF THE INVENTION

1. Technical Field

The present invention relates generally to systems used to chlorinate bodies of water, and more specifically to systems utilizing electrolysis for the electrolytic chlorination of water.

2. Description of Related Art

As is well known, swimming pools, spas, and the like, must be chlorinated to prevent accumulation of algae and bacteria, transfer of disease, and the like. Heretofore, such chlorination has been accomplished by depositing relatively large quantities of sodium hypochlorite into the water to be gradually dissolved over time.

Unfortunately, because this procedure is essentially a periodic single batch operation, the concentration of chlorine is never constant. In order to minimize the number of times necessary to deposit sodium hypochlorite in order to replenish depleted sodium hypochlorite, a significant amount of sodium hypochlorite, often much greater than that recommended for efficacy, is often added to allow a longer time between additions.

These batch addition operations result in high quantities of chlorine being released immediately after the sodium hypochlorite has been added and often causes the water to give off a strong and offensive odor that can make swimming unpleasant. Additionally, the high concentration of chlorine often results in bleaching bathing suits, towels, and the like. Further, a high concentration of chlorine often results in eye and skin irritation, and may even discolor the swimmers' hair.

On the other hand, before the next batch of sodium hypochlorite is added, the chlorine level may fall below a biologically effective level, thus allowing a buildup of bacteria and algae and facilitating the possible transfer of disease. Obviously, none of these effects are desirable.

In addition to the problems caused by batch methods of chlorine control, the particular application and requirements often vary from system to system or within the same system over a period of time, thus requiring a water treatment system capable of multiple configurations or capacities. To accommodate this need, a system may consist of either multiple water treatment systems with each system having specific operating characteristics, or a single water treatment system capable of variable operating characteristics.

Due to concerns about the space required to house multiple systems and the increasing energy costs necessary to operate such a system, it is often most economical, and thus preferable, to put into operation a single, configurable water treatment system capable of handling multiple chlorine output requirements.

Various attempts have been made to provide systems for improving the effective treatment of such bodies of water. Such systems may comprise electrolytic cells for dissociation of a salt to yield a bioactive agent, or may provide for periodic infusion into a body of water of chlorine, provided, for example, by a floating reserve of chlorine tablets. Examples of such systems may be seen with reference to British Patent Number 1,426,017 to Miles; U.S. Pat. No. 3,792,979 to Clinton; U.S. Pat. No. 4,869,016 to Diprose et al.; U.S. Pat. No. 5,460,706 to Lisboa; U.S. Pat. No. 5,468,360 to David et al.; and U.S. Pat. No. 6,821,398 to Von Broembsen.

Because of the variations in chlorine concentration caused by using the batch method, and the limitations in the ability of current art chlorination systems to be adapted to various applications, current chlorine treatments systems have not been entirely satisfactory.

Due to their generally simple design and construction, floating reserve systems are often limited in their capacity to handle multiple requirements. Even though small changes in chlorine output requirement may require simply adding or removing chlorine tablets, the process nonetheless presents many problems. For example, the volume and surface area of chlorine tablets contained within an operating floating reserve system change over a period of time, making it difficult to pre-determine the effect of a subsequent removal or addition of chlorine tablets.

Thus, to change the capacity of a floating reserve system within a specified range, it may become necessary to open the system several times to either add additional chlorine tablets or to remove excess chlorine tablets. This increases the amount of exposure the user has to the chlorine, the amount of time necessary to bring a system back online, the possibility of damaging the system, and the wear and tear on the seals separating the hazardous inner contents of the reserve from the general public.

Additionally, large changes to the capacity may require changing the volume of the floating reserve container, requiring further testing to determine a new baseline of operation to ensure that the changes made have produced the desired effect. This procedure also has the undesired effects mentioned previously with the added costs due to the additional tests.

Current art systems comprised of electrolytic cells for dissociation of a salt provide for increased variability and safety over floating reserve systems. One way to change the chlorine output capacity in an electrolytic cell system is to change the current and voltage across the electrolytic plates. This eliminates the chlorine exposure problem found in floating reserve systems and alleviates the requirement to open the system more than once.

Even so, changing the voltage and current often create undesired secondary effects. For example, increasing the plate current may cause current leakage between cells, or if leakage is already occurring, may exacerbate the problem by increasing the amount of leakage, further decreasing the efficiency of the system. Additionally, increasing the voltage and current increases the power consumption for a given configuration.

If changing voltage and current are not sufficient for a particular need, or the secondary effects described above become unacceptable, another means in which chlorine production capacity in an electrolytic system may be changed is to increase or decrease the total surface area of the electrolytic plates. This is normally accomplished by increasing or decreasing the number and/or size of the plates in the system.

Changing the number or size of plates in currently known systems causes both physical and electro-chemical issues that must be addressed.

For instance, if a large increase in chlorine production capacity is required in currently known systems, a significant number of plates may have to be added, the size of the plates may be increased, or additional electrolytic chlorinators may need to be added in series, each approach being problematic. If electrolytic plates have been added or resized, the system itself may become too bulky or large to fit within a specific area. This may create an inefficient or ineffective use of space and may also reduce the possibility of standardizing overall system and/or housing size, increasing production costs.

In currently known systems, adding additional or resized plates may also cause a significant divergence in the physical stresses placed on the plate support system from one plate to another. Additionally, resizing or adding additional plates in currently known systems is often problematic in that the electrical requirements may be increased to a point beyond the capacity of the currently installed electrical power unit. The addition or resizing of plates in currently known systems may also create variations in fluid flow patterns between the cells, possibly creating uneven reaction rates from plate-to-plate, further reducing the efficiency of the system. Finally, if additional electrolytic chlorinator systems are added, the purchase and installation cost, the electrical and control requirements, the plumbing/piping needs, and the cooling requirements may all be significantly increased.

It will be apparent that none of the above-available water treatment systems provide the several benefits, features and advantages of the present invention. Specifically, none are seen to provide an electrode stack arrangement and design conducive to efficient electrode operation in a baseline configuration and, subsequently, upon further addition of electrode plates. Through the use of such a chlorinator, more efficient control of bioactive chlorination within a body of water may be maintained, while providing for multiple chlorine capacities and while utilizing space in a more efficient manner.

BRIEF SUMMARY OF THE INVENTION

Briefly described, in a preferred embodiment, the present invention overcomes the above-mentioned disadvantages and meets the recognized need for such a device by providing an improved apparatus and method of chlorinating swimming pools, spas, potable water supplies, and the like, wherein the present invention functions to constantly maintain the water at a desired level of chlorination without significant variation and which reduces fading of clothing, discoloration of hair, irritation of skin and eyes, and other disagreeable and dangerous side effects apparent under prior art methods and devices. The present invention further discourages growth of bacteria and algae, and provides that the water will be safe for bathers. The present invention further conveniently and efficiently accommodates the user's need to reconfigure the system based upon desired changes in output capacity.

These advantages of the present invention are preferably attained by providing an improved chlorination system for pools, spas, potable water supplies, and the like, comprising means for maintaining an approximate 0.7% saline solution in said body of water and providing a vertically-oriented electrolytic cell connected between the pump and the body of water. The electrolytic cell comprises metallic electrodes, such as titanium, with the electrodes comprising the cathodic portion of the cell preferably being coated with an oxide of ruthenium and the electrodes comprising the anodic portion of the cell preferably being coated with an oxide of titanium. Means for passing an electric current through the cell is further provided.

The present invention provides a novel electrode stack design, conducive for forming an efficient electrolytic cell comprising a plurality of electrically interconnected electrode stacks, each stack physically separated into quadrants. Non-conductive divider elements are provided between electrode stacks to prevent current leakage and shorting therebetween.

The present invention further provides that the electrode stacks are physically positioned in a non-linear, preferably progressively adjacent 90 degree arrangement contained within a circular housing, separation being provided through the use of the non-conductive divider elements. The dividers eliminate or reduce inter-quadrant fluid flow, and, thereby, current leakage, by preventing horizontal or circular fluid flow while allowing vertical fluid flow within each quadrant. The dividers are sized in a manner that permits the water input to be separated amongst the quadrants.

Still further is provided is an electrode having a tab adjacent its top for electrical interconnection with other like-charged electrodes, and for offsetting oppositely charged, but similarly interconnected, electrodes in a staggered manner. A plurality of electrically interconnected electrode stacks within a common housing form a plurality of independent, but electrically interconnected, cells within a single chlorinator. In accordance with the present invention, the electrically interconnected electrode stacks are arranged into a plurality of cells in series, which provides a highly efficient, low current, high yield, readily configurable, space-saving chlorinator previously unknown in the art.

Accordingly, a feature and advantage of the present invention is its ability to provide an improved chlorination system for pools, spas, potable water supplies, and the like.

Another feature and advantage of the present invention is its ability provide an improved chlorination system for pools, spas, potable water supplies, and the like, which continuously maintains the water at a desired concentration of chlorine without significant variation.

Still another feature and advantage of the present invention is its ability to provide an improved chlorination system for pools, spas, potable water supplies, and the like, which reduces fading of clothing.

Yet another feature and advantage of the present invention is its ability provide an improved chlorination system for pools, spas, potable water supplies, and the like, which reduces discoloration of hair.

Yet still another feature and advantage of the present invention is its ability provide an improved chlorination system for pools, spas, potable water supplies, and the like, which reduces irritation of skin and eyes and other disagreeable and dangerous side effects.

A further feature and advantage of the present invention is its ability to provide an improved chlorination system for pools, spas, and the like, which reduces disagreeable side effects while discouraging growth of bacteria and algae, thus making the water safer for its intended use.

Still a further feature and advantage of the present invention is its ability to provide an improved chlorination system for pools, spas, and the like, comprising means for maintaining an approximate 0.5% saline solution in said pool and providing an electrolytic cell connected between a pump and the pool, and containing a metallic electrode, such as titanium, and having means for passing an electric current through said cell.

Yet still a further feature and advantage of the present invention is its ability to provide an improved chlorination system for pools, spas, and the like, comprising a novel electrode stack design, conducive for forming an efficient electrolytic cell comprising a plurality of interconnecting electrode stacks spatially arranged to reduce the footprint of the electrode stack.

Yet still another feature and advantage of the present invention is its ability to provide an improved chlorination system for pools, spas, and the like, wherein the chlorinator comprises an electrode having a tab adjacent its top for electrical interconnection with other like-charged electrodes, and for offsetting oppositely charged, but similarly interconnected, electrodes in a staggered manner.

Yet still another feature and advantage of the present invention is its ability to provide an improved chlorination system for pools, spas, and the like, wherein the chlorinator further comprises non-conductive spacer elements provided between electrodes, and, further, non-conductive divider elements between electrode stacks, to prevent current leakage and shorting therebetween.

Still a further feature and advantage of the present invention is its ability to provide an improved chlorination system for pools, spas, and the like, wherein the chlorinator comprises a plurality of electrically interconnected electrode stacks within a common housing to form a plurality of independent, but electrically interconnected cells, within a single chlorinator, and wherein electrical connection of this plurality of cells in series provides a highly efficient, low current, high yield chlorinator.

Yet a further feature and advantage of the present invention is to provide a chlorinator effectively utilizing space, both in a present configuration and in contemplating any modifications wherein plates may be added or removed, by using a non-linear cell quadrant arrangement, most preferably, a progressively adjacent 90 degree arrangement contained within a circular housing or "horse shoe" arrangement.

Yet a still further feature and advantage of the present invention is its ability, through the use of dividers separating cells into quadrants, to be reconfigured to maintain or change the output of the system while reducing or minimizing changes in power consumption.

Yet another further feature and advantage of the present invention is its ability, through the use of dividers separating cells into quadrants, to reduce or eliminate current leakage between cells by minimizing or eliminating horizontal or inter-cell ion flow.

Yet an additional feature and advantage of the present invention is its ability, through the use of dividers separating cells into quadrants arranged in a non-linear or progressively adjacent 90 degree arrangement contained within a circular housing, to be reconfigured to maintain or change the output of the system while utilizing the system space in a more efficient manner.

Yet an extra feature and advantage of the present invention is its ability, through the use of dividers separating cells into quadrants, to cause a more consistent fluid flow pattern within each quadrant and from quadrant to quadrant, thus providing a more uniform and predictable reaction rate across the system.

Yet a still further feature and advantage of the present invention is the minimization of penetrations into the system through the use of a novel stack design in combination with optimally configured external electrical connectors.

These and other objects, features, and advantages of the invention will become more apparent to those ordinarily skilled in the art after reading the following Detailed Description and Claims in light of the accompanying drawing Figures.

BRIEF DESCRIPTION OF THE DRAWINGS

Accordingly, the present invention will be understood best through consideration of, and reference to, the following Figures, viewed in conjunction with the Detailed Description of the Preferred Embodiment referring thereto, in which like reference numbers throughout the various Figures designate like structure and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

A particularly advantageous feature of the present invention is the spatial arrangement of the anode and cathode sections, allowing for multiple electrode stacks to be arranged around a common axis. Prior art systems teach a chlorinator having multiple electrode stacks to be arranged in a linear fashion, wherein the addition of electrodes extends the size of the electrode stack along a linear path. Additionally, and in order to accommodate this arrangement of cells around a common axis, another advantageous feature of the present invention are the dividers separating flow between the electrode stacks, reducing current leakage between stacks and also increasing efficiency.

Figure 1:
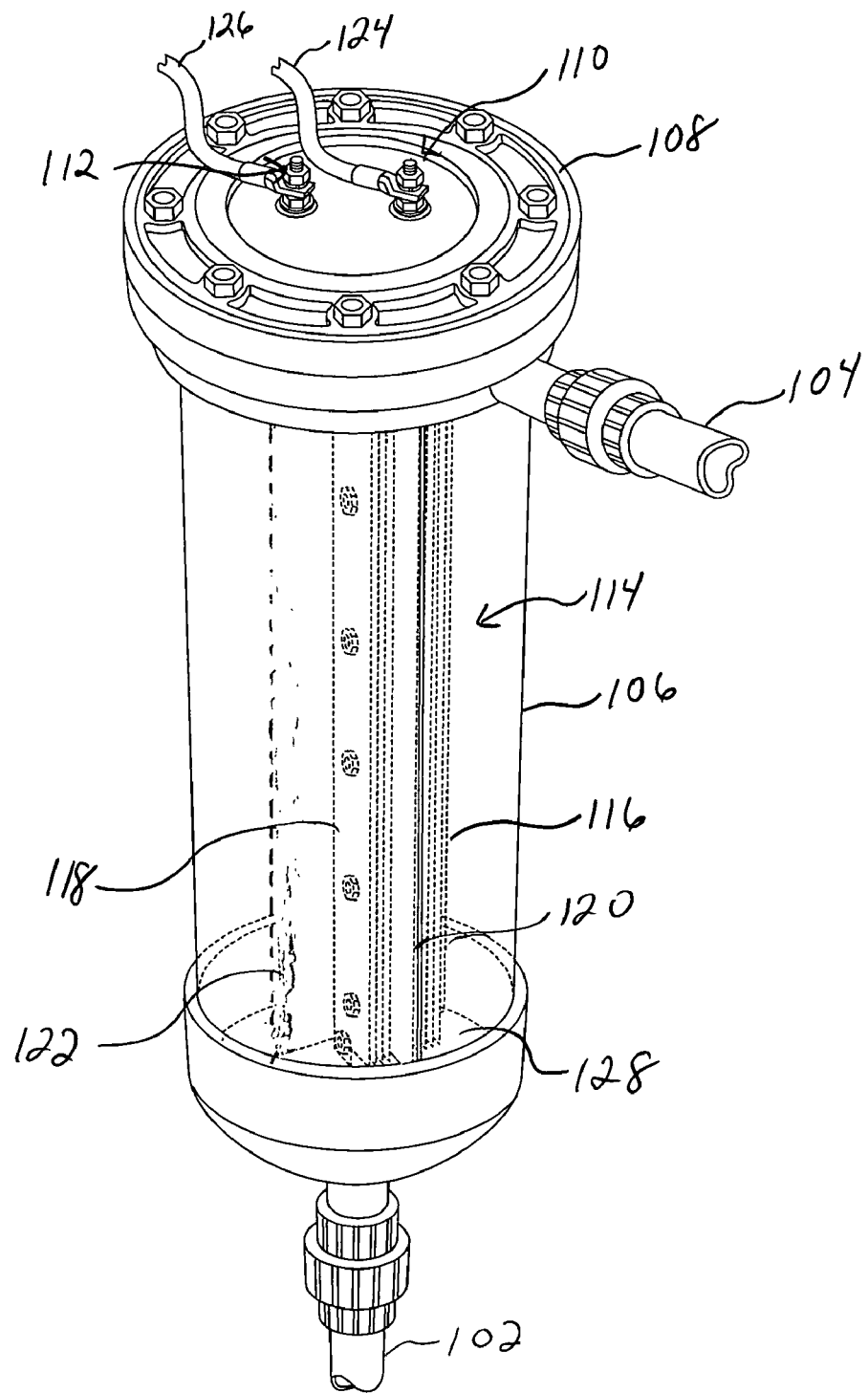
FIG. 1 is a perspective elevation view of a four (4) quadrant chlorinator assembled according to a preferred embodiment of the present invention.

In that form of the present invention chosen for purposes of illustration, FIG. 1 shows a chlorinator 100 connected to a source of water (not shown) by inlet pipe 102 and return pipe 104 to cause water from pipe 102 to pass through chlorinator 100 for chlorination. Chlorinator 100 preferably is a hollow cylindrical member, having cell stack containment housing 106 formed of electrically insulating material, such as clear polyvinyl chloride ("PVC") tubing. Other housing arrangements, including rectangular, are contemplated to be within the scope of the present invention.

FIG. 1 shows the stack containment housing 106 to be vertically oriented, though it should be appreciated that the present invention can be mounted in any orientation, ranging from horizontal to vertical. It should also be appreciated that in alternative designs, stack containment housing 106 may be designed in various shapes, such as rectangular, depending on the specific application. Additionally, inlet pipe 102 is shown to be a common inlet feeding all electrolytic cells, though it should be understood that an alternate embodiment may comprise separate water inlets for each quadrant of the chlorinator.

In a preferred embodiment of the present invention, stack containment housing 106 is provided with a flanged union 108, or other suitable, removable cap sufficient for supporting chlorinator internal assembly 114, preferably also of PVC. Union 108 is provided atop housing 106. It should be noted that in certain applications, it may be more efficient to configure the system without flanged union 108. As an example, it may be more efficient to operate without flanged union 108 in systems that provide adequate ventilation above the present invention to remove any potentially explosive gases. Accordingly, union 108 is considered to be entirely optional in practicing the invention hereof.

Through housing 106 are mounted a pair of current header connector rod assemblies 110, 112 which connect electrode assembly 114 to direct current power supply, supplied through wires 124, 126 to current header connector rod assemblies 110, 112 in order to cause a low voltage (less than 12 volts) direct current to flow within electrode assembly 114. The electrodes forming electrode assembly 114 are preferably formed of titanium, with those electrodes connected to the positive power supply being coated with an oxide of Ruthenium and those electrodes connected to the negative power supply being coated with an oxide of titanium, as discussed in further detail below. It will be recognized by those ordinarily skilled in the art that the just-described normal operating polarity may be electrically reversed in order to provide touch-free cleaning of electrode assembly 114.

In further detail, the electrode assembly 114 is shown having electrode stacks 116, 118. Electrode stacks 116, 118 have electrodes which are electrically connected in a manner described further in FIGS. 4 and 5. Dividers 120, 122 may extend essentially from the inner bottom of housing 106 to the inner top of housing 106 and essentially to the full inner dimension of housing 106. Dividers 120, 122 are sized and mounted in a manner to partition electrode assembly 114 fluid flow into quadrants, such that each quadrant contains an electrode stack 116, 118 and that fluid and ion flow between quadrants is reduced or eliminated. Though the flow of fluid through the electrode stacks is partitioned into quadrants, it should be understood that the electrode stacks remain electrically connected in a manner described in further detail below.

This method of arranging electrode stacks around a common point provides for a smaller chlorinator footprint for the same output capacity. As shown in FIG. 1, electrode stacks 116, 118 are essentially wrapped around an invisible common axis, reducing the area and volume of electrode assembly 114 while maintaining chlorinator 100 chlorine output capacity.

Figure 2:
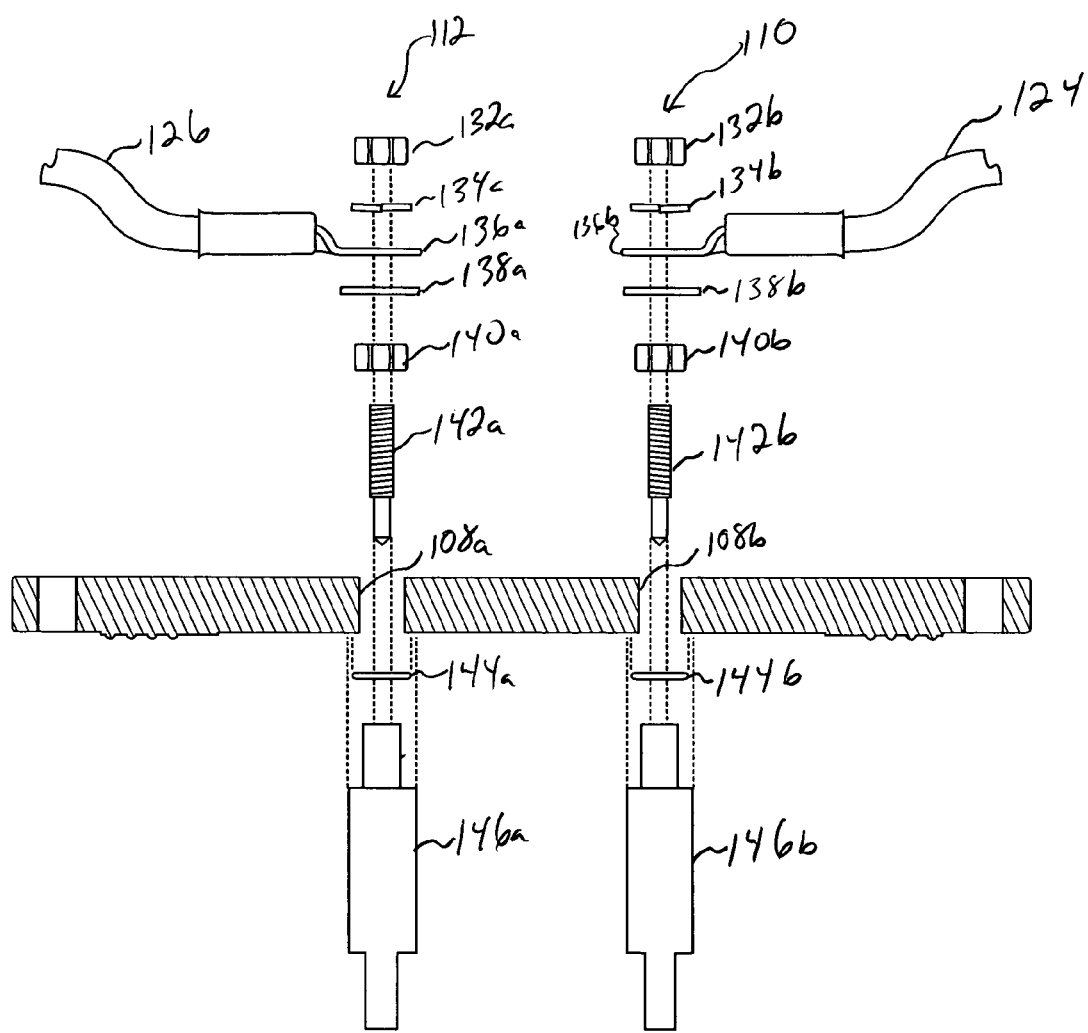
FIG. 2 is a partial vertical section and exploded view through an electrolytic cell of the chlorination system of FIG. 1 showing a single electrode of each polarity.

FIG. 2 illustrates the construction of current header connector rod assemblies 110, 112. Due to their similar construction, current header connecter rod assemblies 110, 112 are described without reference to polarity, though it should be understood that during operation, one current header connector rod assembly will be used as a cathode and the other current header connector rod assembly will be used as an anode. Low voltage direct current is applied to connector rods 146a, 146b through wires 124, 126, flat tongue lug code conductor 136a, 136b, through metallic threaded rod 142a, 142b. Particularly advantageous to the present invention, metallic threaded rod 142a, 142b engages with connector rod 146a, 146b through the use of threads (not shown) internal to connector rod 146a, 146b.

Current header connector rod assembly 110, 112 is secured to flange union 108 by non-conducting nut 140a, 140b, metallic flat washer 138a, 138b, metallic lock washer 134a, 134b and metallic nut 132a, 132b. To prevent fluid leakage, and to accommodate dimensional variation due to thermal cycling and resistive heating, o-ring 144a, 144b is, seated between connector rod 146a, 146b and flange union 108. In the preferred configuration, metallic threaded rod 142a, 142b, metallic nut 132a, 132b, metallic flat washer 138a, 138b and metallic lock washer 134a, 134b are constructed of brass.

Figure 3:
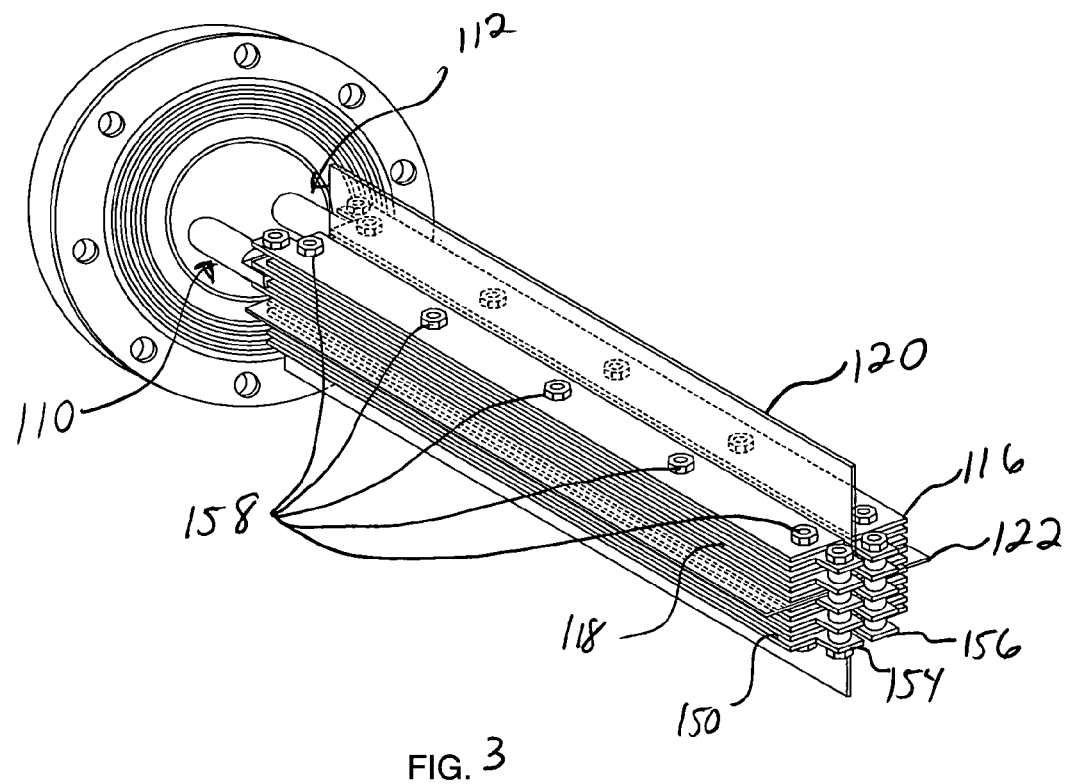
FIG. 3 is a perspective elevation view of an electrode assembly showing the spatial placement of the electrode stacks in accordance with the chlorination system of FIG. 1.
Figure 4:
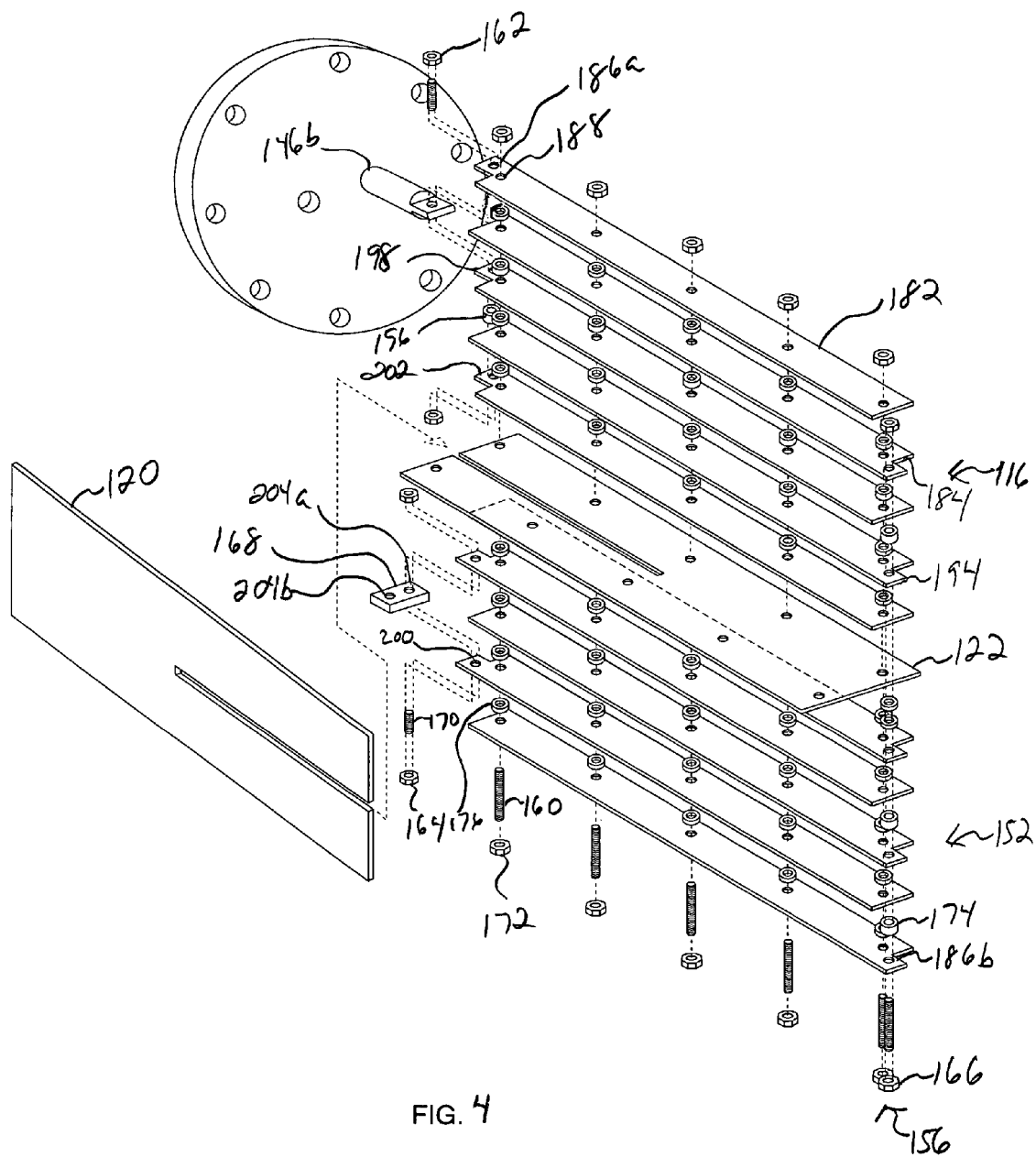
FIG. 4 is a perspective, exploded elevation view of the cathode assembly in accordance with the chlorination system of FIG. 1.
Figure 5:
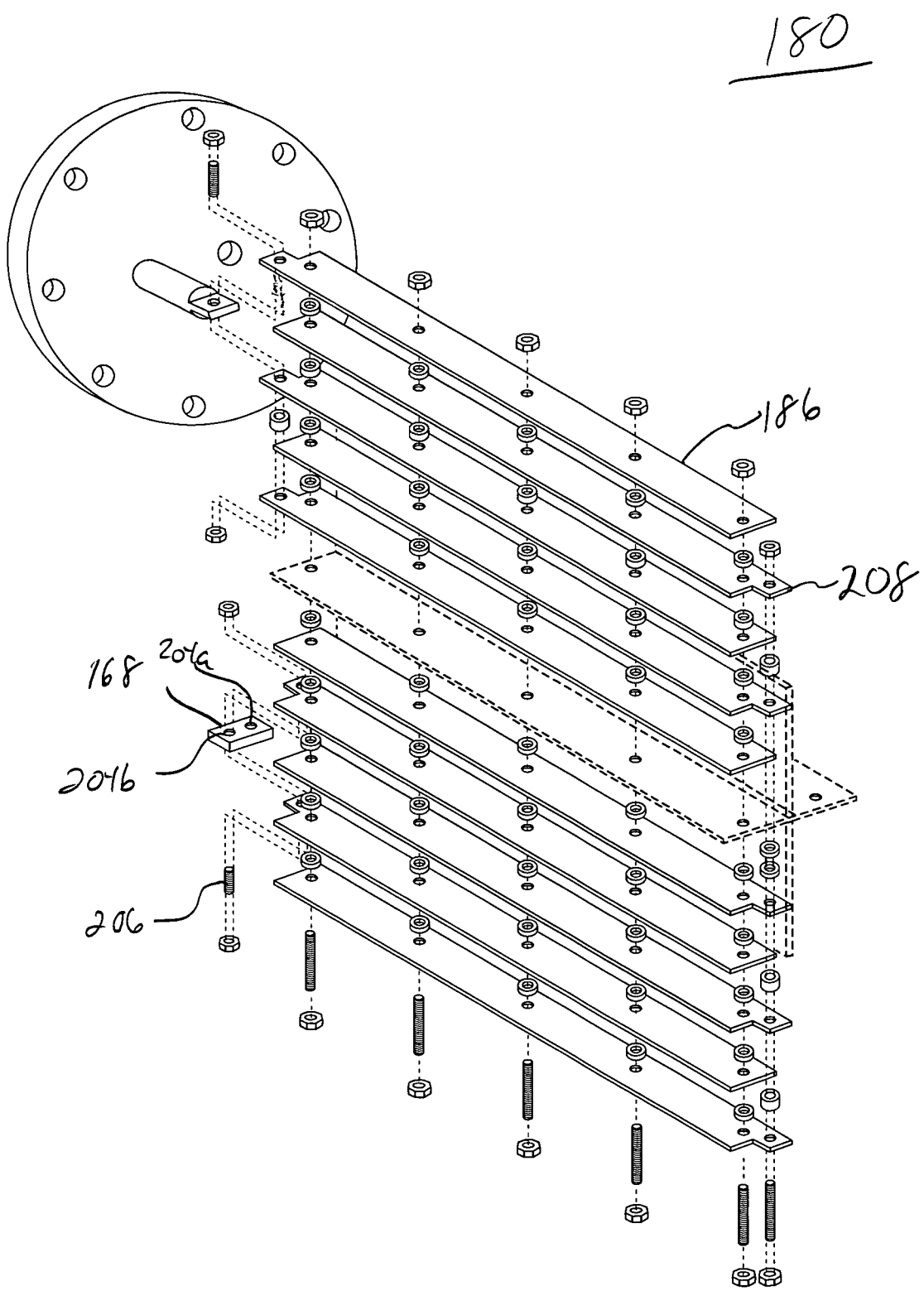
FIG. 5 is a perspective, exploded elevation view of the anode assembly in accordance with the chlorination system of FIG. 1.

Turning now to the details of a preferred layout of electrode assembly 114, FIG. 3 illustrates a 4 quadrant electrode assembly. Electrode stack 116, 118, 150, 152, described in further detail in FIGS. 4 and 5, is electrically and mechanically connected via connector assembly 154, 156, described below in further detail in association with FIGS. 4 and 5. Electrical power is supplied to electrode assembly 114 via current header connector rod assembly 110, 112. Particularly advantageous to the present invention, dividers 120, 122 partition fluid flow through electrode assembly 114 such that inter-quadrant fluid and ion flow is reduced or eliminated, increasing the efficiency of electrode assembly 114. Electrodes in electrode stack 116, 118, 150, 152 are additionally mechanically connected by titanium threaded rod (not shown) which is carried by nut 158, described below in further detail in association with FIGS. 4 and 5 below.

FIG. 4 further illustrates construction of cathode assembly 178 of electrode assembly 114. It should be noted that where components are redundant, only one component is described for clarity and simplicity. Additionally, depending upon the specific application, including space or output requirements, the physical arrangement of electrode assembly 114, linkages, and materials used may vary.

As shown, electrode stacks 116, 152 are comprised of a plurality of metallic plate electrodes 182, 184. Metallic plate electrodes comprising the cathode assembly 178 of the cell are preferably coated with an oxide of Ruthenium and the metallic plate electrodes forming the anode assembly 180, as well as inactive plates not connected to either polarity, are preferably coated with an oxide of titanium, as shown further in FIG. 5.

A particularly advantageous feature of the invention are non-conducting dividers 120, 122 which act to isolate one electrode stack fluid flow from another electrode stack fluid flow to prevent channeling of current between cells. For example, non-conducting dividers 120, 122 essentially isolates the fluid and ion flow in electrode stack 116 from the fluid flow in electrode stack 152.

Current connector tabs 190 preferably are formed integrally with electrodes 182, 184. In the preferred configuration, metallic plate electrodes 182, 184 are aligned in an alternating manner such that connector tab 190 location is diametrically opposed to connector tab 194, and further aligned such that connector tab 190 can be mechanically connected to connector rod 146b, thus serving as an active, or electrically charged, electrode plate. Furthermore, metallic electrode plate 184 having connector tab 194 acts as an inactive, or electrically neutral, plate. Connecting hole 186a is provided within each tab 190, 194. Additional connecting holes 188 are provided within each electrode 182, 184 for purposes described more fully hereinbelow.

To provide for mechanical rigidity of cathode assembly 178, a plurality of non-conducting spacers 176 are disposed between each electrode 182, 184 at additional connecting holes 188. Non-conducting threaded rod 160 is carried within hole 188 of electrodes 182, 184. Non-conducting threaded rod 160 further carries non-conducting spacer 176 and non-conducting nuts 172 which are provided to assemble the cathode assembly 178 in order to provide electrode stack 178 with sufficient structural rigidity for operation and handling of stack 178, while maintaining electrical separation of electrodes 182, 184.

To provide for electrical connectivity of active electrodes, a titanium spacer 196 is disposed between current connector tabs 198, 202 of electrodes 182 at connecting holes 186a so as to electrically connect electrodes 182, while bridging and separating electrodes 182 from electrodes 184. To provide for electrical connectivity of inactive electrodes 184, a plurality of metallic spacers 174 are disposed between current connector tabs 194 of electrodes 184 at connecting holes 186b so as to electrically connect electrodes 184, while bridging and separating electrodes 184 from electrodes 182.

To provide further electrical connectivity between inactive electrode plates 184 in cathode assembly 178 and anode assembly 180, as shown in FIG. 5, threaded titanium rod 170 is carried within hole 200 of electrodes 184 situated in the quadrant opposite to those electrodes 184 situated within the quadrant containing connector rod 146b. Threaded titanium rod 170 further carries metallic spacer 168 through hole 204a, wherein a threaded titanium rod 206, as shown in FIG. 5, contained within the anode assembly 180, as shown in FIG. 5, of the electrode assembly 114.

Figure 6:
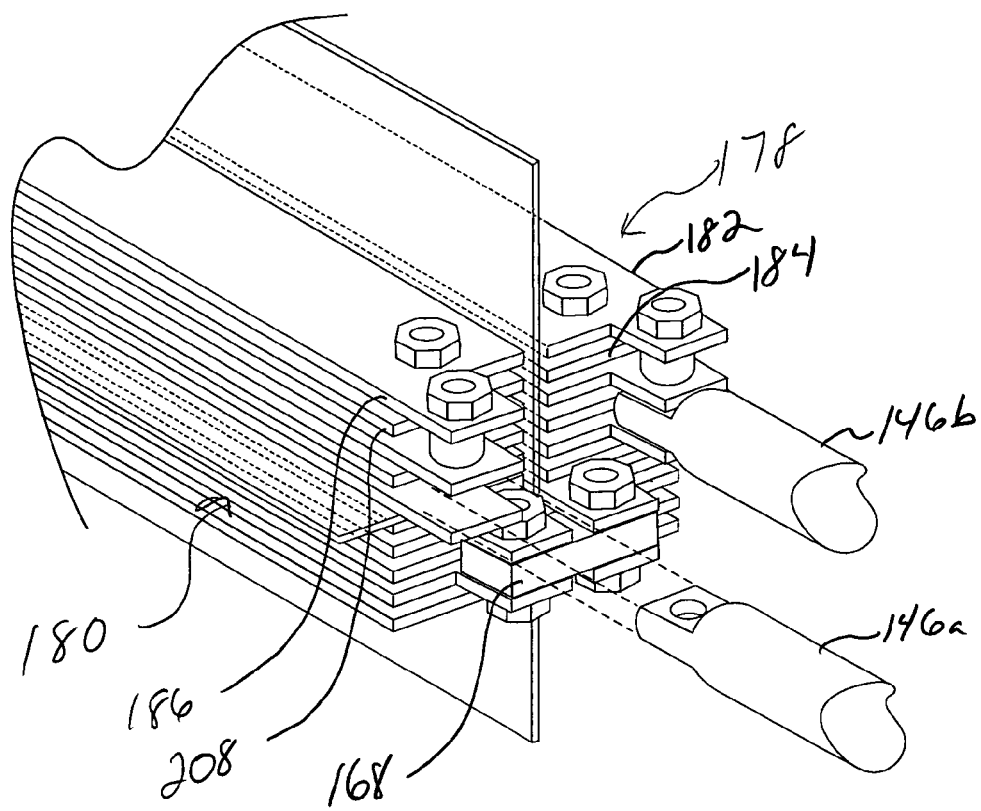
FIG. 6 is a perspective elevation view of both the anode and cathode assemblies showing in greater detail the electrical and mechanical connectivity between the two assemblies in accordance with the chlorination system of FIG. 1; and, FIG. 7 illustrates the connectivity of active and non-active plates in accordance with the chlorination system of FIG. 1.

In a preferred embodiment, the mechanical and electrical configuration of cathode assembly 178 and anode assembly 180 will be essentially identical, with each being mirror images of each other, as shown in FIG. 6. Cathode assembly 178 has active electrodes 182 whereas anode assembly 180 has active electrodes 186. Cathode assembly 178 has inactive electrodes 184 whereas anode assembly 180 has inactive electrodes 208. Metallic spacer 168 is shown connecting inactive plates 184 from cathode assembly 178 to inactive plates 208 from anode assembly 180. Additionally, active electrodes 186, comprising a titanium substrate, will be coated with an oxide of titanium rather than an oxide of ruthenium, as in active electrodes 182. Such arrangement provides the ability to design an optimal number of electrodes 182, 184 and spatial arrangement of electrode stacks 116, 152, resulting in a large number of adjacent, insulated, and separate, but electrically interconnected, electrolytic cells within a minimal size of containment housing 106.

Figure 7:
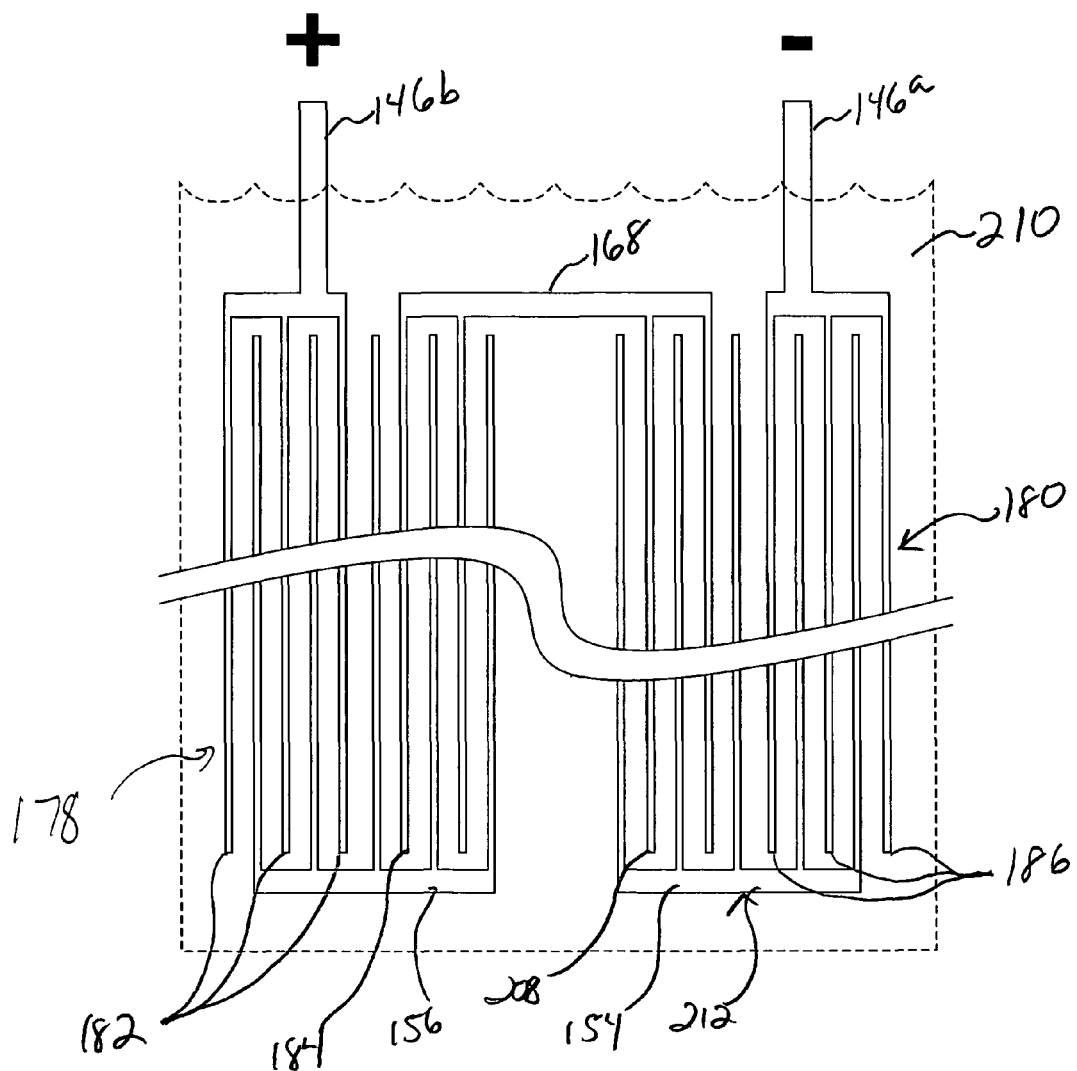

FIG. 7 illustrates the electrical connectivity of electrode assembly 114 submerged within electrolytic solution 210. Shown are cathode assembly 178 and anode assembly 180 with active electrodes 182, 186 electrically connected to their respective connector rod 146b, 146a. Inactive plates 184, 208 are electrically connected via connector assembly 156, 154 as well as metallic spacer 168.

Such features render the present invention more economical, efficient, and safe than other prior art devices, and therefore, represent a distinct advance over other prior art devices.

It should also be noted that electrode stack positioning refers to the physical, not electrical, arrangement of the electrode stacks. For instance, a four quadrant electrolytic cell system may comprise two active electrode stacks, one cathodic and one anodic, and two non-active or neutral stacks. It is contemplated to be within the scope of the present invention to have the active electrode stacks positioned adjacent to one another, positioned "caddy corner" to each other, or any other arrangement. Additionally, it is contemplated to be within the scope of the present invention to have varying number of cathodic or anodic electrode stacks. For instance, a four quadrant electrolytic cell may have two anodic electrode stacks, one cathodic electrode stack and one neutral electrode stack. Finally, it is contemplated to be within the scope of the present invention to have a varying number of sections depending on the type of non-conductive housing used. For instance, a 6 section electrolytic cell may be used, wherein three sections are anodic and three sections are cathodic, with no neutral section.

Having, thus, described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein, but is only limited by the following claims.

What is claimed is:

1. A chlorinator for a body of water, comprising:
an electrolytic cell comprising four electrode stacks positioned in quadrants around a common axis, each of said electrode stacks comprising at least one first electrode for carrying an electrical charge of a first polarity, each of said electrode stacks further comprising at least one second electrode for carrying an electrical charge of a second polarity, each of said second electrodes being in spaced-apart arrangement to a corresponding said first electrode, the electrode stacks being electrically interconnected;
a first current header connecting rod electrically connected to a first electrode;
a second current header connecting rod electrically connected to a second electrode;
an electrically insulating housing for said electrolytic cell, said insulating housing carrying a water inlet means;
a non-conductive divider comprising a first portion and a second portion, said first portion oriented approximately perpendicular to said second portion, said divider disposed axially between said electrode stacks, and separating said electrode stacks into said quadrants, said non-conductive divider isolating the flow of charged ions proximate each electrode stack from adjacent electrode stacks; and
means for supplying electrical power from a power supply to said electrolytic cell at said first and second current header connecting rods.

2. The chlorinator of claim 1 wherein said electrolytic cell comprises at least one first electrode coated with an oxide of titanium and at least one second electrode coated with an oxide of ruthenium.

3. The chlorinator of claim 2 wherein said first and second electrodes comprise a titanium substrate.

4. The chlorinator of claim 2 wherein said first electrode coated with an oxide of titanium is connected to the positive side of said power supply.

5. The chlorinator of claim 2 wherein said second electrode coated with an oxide of ruthenium is connected to the negative side of said power supply.

6. The chlorinator of claim 1 wherein said second electrode is oriented parallel to said first electrode.

7. The chlorinator of claim 1 wherein said first current header connecting rod is electrically connected to said first electrode via a threaded member penetrating tab carried by said first electrode, said tab being oriented normal to said first electrode orientation.

8. The chlorinator of claim 1 wherein said second current header connecting rod is electrically connected to said second electrode via a threaded member penetrating tab carried by said second electrode, said tab being oriented normal to said second electrode orientation.

9. The chlorinator of claim 1 wherein said electrically insulating housing is a cylinder.

10. The chlorinator of claim 1 wherein said electrically insulating housing water inlet means is adjacent a lower end thereof and a water outlet means is disposed near an upper end.

11. The chlorinator of claim 1 wherein said power supply comprises a direct current power supply.

12. The chlorinator of claim 11, wherein said direct current power supply polarity is reversible.

13. A chlorinator for a body of water, comprising:
an electrolytic cell comprised of four electrode stacks disposed in quadrants, wrapped about an x-y axis, each of said electrode stacks comprising at least one first electrode for carrying an electrical charge of a first polarity, each of said electrode stacks further comprising at least one second electrode for carrying an electrical charge of a second polarity, each of said second electrodes being in spaced-apart arrangement to a corresponding said first electrode, the electrode stacks being electrically interconnected;
a first current header connecting rod electrically connected to a first electrode;
a second current header connecting rod electrically connected to a second electrode;
an electrically insulating housing for said electrolytic cell, said insulating housing carrying a water inlet means;
at least one non-conductive divider comprising a first portion and a second portion, said first portion oriented approximately perpendicular to said second portion, said divider disposed axially between said electrode stacks, and separating said electrode stacks into said quadrants, said non-conductive divider isolating the flow of charged ions proximate each electrode stack from adjacent electrode stacks; and
means for supplying electrical power from a power supply to said electrolytic cell at said first and second current header connecting rods.

14. A chlorinator system, said system comprising:
an electrolytic cell comprising four physically parallel electrode stacks;
an electrically insulating housing surrounding said electrolytic cell, said insulating housing carrying a water inlet means adjacent a first end thereof and a water outlet means disposed near a second end thereof; and
a means for positioning said plurality of electrode stacks approximately equidistant about a central x-y axis, said means comprising a non-conductive divider, said divider further comprising a first portion and a second portion, said first portion oriented approximately perpendicular to said second portion, said divider disposed axially between said electrode stacks, and separating said electrode stacks into quadrants, said non-conductive divider isolating the flow of charged ions proximate each electrode stack from adjacent electrode stacks.

15. The system of claim 14 wherein said insulating housing is a cylinder.

* * * * *